(12) United States Patent
Hengstler et al.

(10) Patent No.: US 11,480,452 B2
(45) Date of Patent: Oct. 25, 2022

(54) FIELD DEVICE HOUSING WITH A MONITORING DEVICE

(71) Applicant: VEGA GRIESHABER KG, Wolfach (DE)

(72) Inventors: Clemens Hengstler, Haslach (DE); Fabian Witt, Hofstetten (DE); Dominik Fehrenbach, Rottweil (DE)

(73) Assignee: Vega Grieshaber KG, Wolfach (DE)

( * ) Notice: Subject to any disclaimer, the term of this patent is extended or adjusted under 35 U.S.C. 154(b) by 58 days.

(21) Appl. No.: 16/989,459

(22) Filed: Aug. 10, 2020

(65) Prior Publication Data

US 2021/0048321 A1   Feb. 18, 2021

(51) Int. Cl.
*G01D 11/24* (2006.01)
*G12B 9/04* (2006.01)

(52) U.S. Cl.
CPC ............ *G01D 11/245* (2013.01); *G12B 9/04* (2013.01)

(58) Field of Classification Search
CPC ................................ G01D 11/245; G12B 9/04
See application file for complete search history.

(56) References Cited

U.S. PATENT DOCUMENTS

| 11,129,370 B1* | 9/2021 | Shaw | A01M 1/2094 |
| 2005/0113942 A1* | 5/2005 | Longsdorf | G05B 19/0425 700/79 |
| 2007/0086084 A1* | 4/2007 | Mori | G08B 13/04 359/362 |
| 2018/0035087 A1* | 2/2018 | Xu | H04N 9/3155 |

FOREIGN PATENT DOCUMENTS

| CN | 2691632 Y * | 4/2005 | |
| CN | 104011561 A * | 8/2014 | G01S 17/04 |
| DE | 102012200070 | 1/2012 | |
| DE | 102013200685 | 1/2013 | |
| DE | 102015122278 | 12/2015 | |
| WO | WO-2013142962 A1 * | 10/2013 | G08B 29/046 |
| WO | WO 2016/189196 | 1/2016 | |
| WO | WO 2020/027721 | 2/2020 | |

* cited by examiner

*Primary Examiner* — Jamel E Williams
(74) *Attorney, Agent, or Firm* — William Gray Mitchell

(57) ABSTRACT

A field device housing with electronics disposed in the field device housing and a monitoring device, characterized by electronics which electrically check the monitoring device and by the monitoring device, which displays a state of the field device housing.

9 Claims, 3 Drawing Sheets

FIELD DEVICE HOUSING WITH A MONITORING DEVICE

CROSS REFERENCE TO RELATED APPLICATIONS

This patent application claims priority to German Patent Application 102019121909.4, filed on Aug. 14, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.
SEQUENCE LISTING INCLUDED AND INCORPORATED BY REFERENCE HEREIN
Not applicable.

BACKGROUND

Field of the Invention

The invention is a field device housing with a monitoring device.

BACKGROUND OF THE INVENTION

Field devices are frequently used in the field of process automation engineering to record process parameters. Such field devices can comprise a housing, a sensor, and an electronics unit disposed in the housing. The sensors convert the physical parameter to be measured, which is detected by means of physical or chemical effects, into an electrical signal that can be processed further. The sensors can comprise a transducer, a converter, an input and an output. These sensors can be radar or ultrasonic sensors, for example, that measure the distance from an object to a reference point. The change in the distance is converted into a standard signal or sent to a control device via a fieldbus. These types of sensors are often also coupled to superordinate units, such as control systems or control units.

These field devices can furthermore be installed in safety-relevant areas, such as explosion-prone areas. It has to consequently be ensured that the housings are completely closed, so that no voltage-related flashover from the electronics can occur in the explosion-prone areas. For example, a defect in the housing or the housing cover could result in incomplete closing that may, however, not be readily visually detectable. It is therefore necessary to monitor the housing to ensure that there are no defects, for example, on a housing wall.

These defects, such as cracks, may not be visible to the eye, but it is nonetheless important to detect them early; for example to prevent crack propagation. To make these defects visible, a variety of techniques for component inspection are known from materials science.

In particular, ultrasound is used. One disadvantage, however, is that these component inspections have to be carried out at regular intervals. This also requires a high amount of personnel involvement. Furthermore, there is no guarantee that the damage will be detected early enough.

The object of the invention is therefore to provide a field device housing which ensures safe operation of the field device, detects defects early and allows the state of the field device housing to be checked more cost-effectively.

This object is achieved by a field device housing having the features described herein. Advantageous embodiments of the invention are also disclosed.

BRIEF SUMMARY OF THE INVENTION

In a preferred embodiment, a field device housing (1) with electronics (4) disposed in the field device housing (1) and a monitoring device (3), characterized in that the electronics (4) electrically check the monitoring device (3), and that the monitoring device (3) indicates a state of the field device housing (1).

In another preferred embodiment, the field device housing (1) as described herein, characterized in that the monitoring device (3) is integrated in a wall (8) of the field device housing (1).

In another preferred embodiment, the field device housing (1) as described herein, characterized in that the monitoring device (3) is disposed on an inner side of the field device housing (1).

In another preferred embodiment, the field device housing (1) as described herein, characterized in that a power supply of the field device is interrupted, or the electronics switch off, when the state changes.

In another preferred embodiment, the field device housing (1) as described herein characterized in that the electronics (4) are configured to send a signal to a superordinate unit, preferably a control center, when the state changes.

In another preferred embodiment, the field device housing (1) as described herein, characterized in that the monitoring device (3) forms a conductor path (3), and that the change in the state is a change in capacitance or an increase in resistance, preferably a conductor path break (6).

In another preferred embodiment, the field device housing (1) as described herein, characterized in that the field device housing (1) is made of a plastic, preferably an injection-moldable plastic.

In another preferred embodiment, the field device housing (1) as described herein, characterized in that the field device housing (1) comprises a housing cover (7), and that the housing cover (7) is configured according to any one of claims 1 to 7.

In another preferred embodiment, the field device housing (1) as described herein, characterized in that the housing cover (7) comprises a receiver element (10) and the electronics (4) comprise a transmitter element (9), wherein the electronics (4) monitor the conductor path (3) in the housing cover (7) via a signal sent back from the transmitter element (9) to the receiver element (10).

In another preferred embodiment, a method for producing a field device housing (1) with a conductor path (3), comprising the following steps:
printing and applying conductor paths (3) to a plastic base,
inserting the plastic base into a plastic matrix by means of an injection molding process,
characterized in that the plastic matrix forms the field device housing (1).

In another preferred embodiment, a method for determining a state of a field device housing (1) with a monitoring device (3), wherein electronics (4) which are configured to monitor the state of the monitoring device (3) and react to a change in the state are disposed in the field device housing (1).

DETAILED DESCRIPTION OF THE INVENTION

Figure 1:
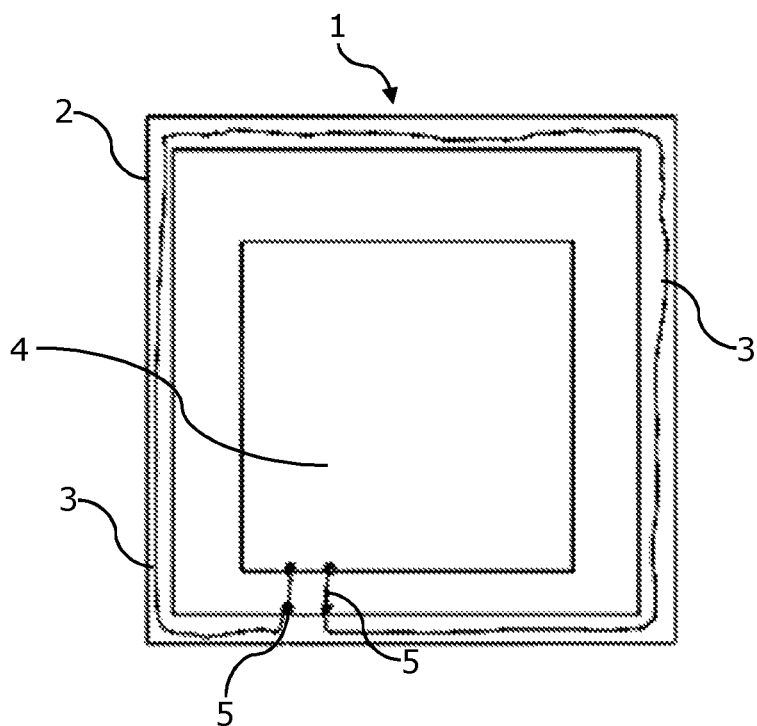
FIG. 1 is a schematic illustration of a field device housing according to the invention with an integrated monitoring device.

The field device housing invention comprises electronics disposed in the field device housing and a monitoring device. The field device housing is characterized by the electronics, which electrically check the monitoring device, and by the monitoring device, which indicates a state of the field device housing.

The monitoring device can be continuously monitored by the electronics. The state of the field device housing can be indicated by the monitoring device. If there is a change in the monitoring device, the state of the field device housing may also have changed. This eliminates the need for cumbersome, manual measuring methods, such as checking the field device housing using an ultrasonic measuring device, which in turn saves costs. This also ensures that changes to the field device housing are detected early enough and that the field device housing is sealed at all times. The field device housing according to the invention can be polygonal or cylindrical.

According to a first advantageous embodiment, the monitoring device can be integrated in a wall of the field device housing.

As a result, the monitoring device can be protected from external influences, such as moisture. The monitoring device can also be protected by the field device housing from damage caused by removal or installation of the electronics. The installation space of the field device housing for the installation of the monitoring device can furthermore remain unchanged.

In this application, integrated means that the monitoring device and the field device housing according to the invention are manufactured during the production process to form one component, which cannot be dismantled into its individual parts without being destroyed. Production can be carried out using the IMSE (injection molded structural electronics) manufacturing process. To do this, components of the monitoring device are printed onto a plastic base. The printed plastic base is then coated with a plastic matrix using an injection molding process. The injection-moldable plastic can be a thermosoftening plastic. The injection-moldable plastic can also be a thermosetting plastic. The injection-moldable plastic can also be a material mixture of a thermosetting and a thermosoftening plastic, as long as the materials are compatible.

According to a further advantageous embodiment, the monitoring device can be disposed on an inner side of the field device housing. By installing the monitoring device on the inner side of the field device housing, the monitoring device can be protected from influences outside the field device housing.

According to a further advantageous embodiment, a power supply to the field device can be interrupted when the state changes. Alternatively, the electronics can switch off. This can prevent a voltage-related flashover from the electronics in an explosion-prone area. Because of the monitoring device, a malfunction of the electronics is no longer possible. The field device housing according to the invention can therefore be designed such that the electronics can also be operated safely in hazardous areas.

According to a further advantageous embodiment, the electronics can be configured to send a signal to a superordinate unit, preferably a control center, when the state changes.

The signal can be sent, for example, via an interference current in accordance with the 4-20 mA protocol or as a digital signal, for example a HART signal. It can be an optical and/or acoustic signal, for example, that transmits an indication, information, or a warning that the electronics are switched off.

According to a further advantageous embodiment, the monitoring device can form a conductor path, and the change in the state can be a change in capacitance or an increase in resistance, preferably a conductor path break. The conductor paths can preferably have the same elongation at break as the plastic material of the field device housing according to the invention. The conductor paths can particularly preferably have a lower elongation at break than the field device housing according to the invention. More than one conductor path can also be integrated into the field device housing. Furthermore, more than one conductor path can be disposed on the inner side of the field device housing. It is accordingly also possible that at least one conductor path is integrated into the field device housing and at least one further conductor path is disposed on the inner side of the field device housing. A conductor path can also be integrated into the field device housing and extend partially on the inner side of the field device housing. The conductor paths can be laid in any way, as long as a monitoring function of the conductor paths for the field device housing can be ensured.

A capacitance can be formed by two installed conductor paths, whereby damage to at least one conductor path can cause a change in capacitance, for example, that is detected by the electronics. A coil can also be installed in an oscillating circuit. A change in the coil, for example an inductance, can then be detected by the electronics. The capacitance and the inductance can be integrated, for example via an oscillating circuit, the resonance frequency of which is monitored by the electronics.

According to a further advantageous embodiment, the field device housing can be made of a plastic, preferably an injection-moldable plastic. The monitoring device can consequently be integrated into the field device housing according to the invention. The monitoring device can alternatively be glued to an inner side of the field device housing.

According to a further advantageous embodiment, the field device housing can comprise a housing cover, for example a lid. The housing cover can furthermore be configured according to the features of all of the advantageous embodiments mentioned above. The housing cover can be mounted on the field device housing according to the invention in a releasable manner. After removing the housing cover, the electronics can be removed or replaced. It is also possible for repairs to be carried out in the interior of the field device housing.

According to a further advantageous embodiment, the housing cover can comprise a receiver element, and the electronics can comprise a transmitter element, wherein the electronics can monitor the conductor path in the housing cover via a signal sent back from the transmitter element to the receiver element. As a result, a state of the housing cover can be monitored continuously as well. The housing cover does not have to have its own electronics for this. As a result of a change in the state of the housing cover, the receiver element can return an incorrect, i.e., a changed, signal to the transmitter element. A change in the state of the housing cover can also result in no signal being sent from the receiver element back to the transmitter element.

A method according to the invention is for producing a field device housing with a conductor path and comprises the following steps: Printing and applying conductor paths to a plastic base and then inserting the plastic base into a plastic matrix by means of an injection molding process. The plastic matrix thus forms the field device housing. This manufacturing process enables cost-effective production and a high number of units while at the same time offering great flexibility in the geometric design of the field device housing and the arrangement of the monitoring device.

A further method according to the invention is for determining a state of a field device housing with a monitoring device, wherein electronics which are configured to monitor the state of the monitoring device and react to a change in the state are disposed in the field device housing. This results in a monitoring of the field device housing, whereby a change in the state of the monitoring device can be accompanied by a change in the state of the field device housing.

Monitoring is preferably carried out continuously. Monitoring can also be carried out cyclically, so that the electronics carry out separate measurements and compare two measurements to one another. If the measurements differ from one another and the deviation exceeds a defined value, the electronics can be switched off. These measurements can be two measurements from the ongoing operation. Alternatively, a measurement from the ongoing operation can be compared to a previously performed calibration measurement.

DETAILED DESCRIPTION OF THE FIGURES

Figure 2:
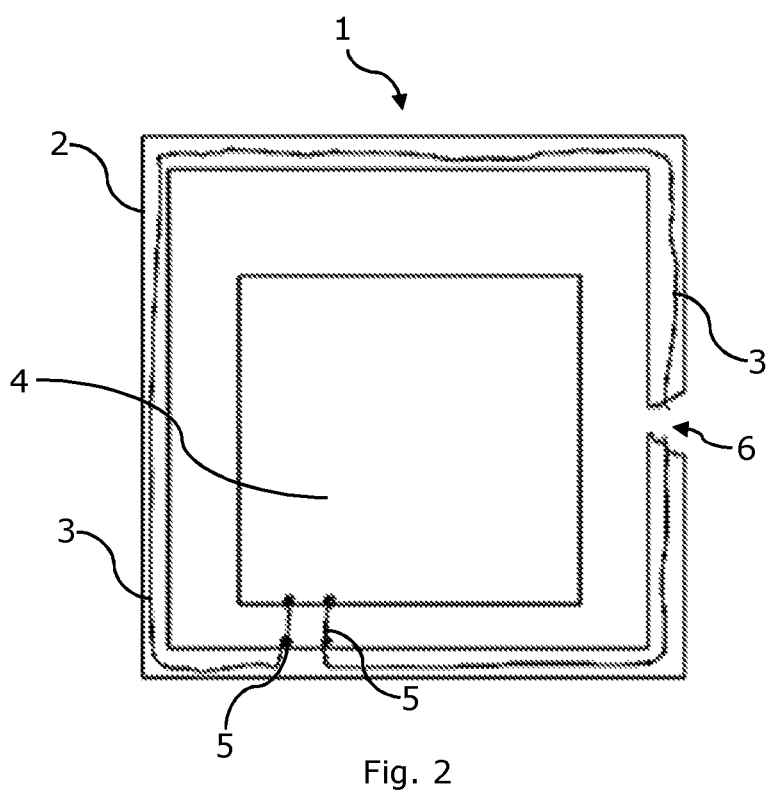
FIG. 2 is a schematic illustration of the field device housing of FIG. 1, wherein the field device housing has a defect.

FIG. 1 and FIG. 2 show a first preferred design example. Unless shown otherwise, the same reference signs in the various design examples identify the same features with the same functions. A field device housing 1 according to the first design example is square and comprises a housing wall 2, wherein the housing wall 2 is made of an injection-moldable plastic.

A conductor path 3 is furthermore integrated into the housing wall 2. In this application, integrated means that the conductor path 3 and the field device housing 1 are manufactured during the production process to form one component, which cannot be dismantled into its individual parts without being destroyed. Production is carried out using the IMSE (injection molded structural electronics) manufacturing process. For this, the conductor path 3 is printed onto a plastic base. The printed plastic base is then coated with a plastic matrix using an injection molding process. The injection-moldable plastic is a thermosoftening plastic.

The field device housing 1 further comprises electronics 4 in its interior. The conductor path 3 is connected to the electronics 4 via two connecting elements 5. The conductor path 3 continuously monitors the state of the field device housing 1. FIG. 2 shows the first preferred design example with a conductor path break 6. In the event of a conductor path break 6, the electronics 4 send a signal to a superordinate unit not shown in the figure. This signal can be electrical, optical or acoustic, for example. The signal can thus contain a message, such as an advisory message or a warning message.

Figure 3:
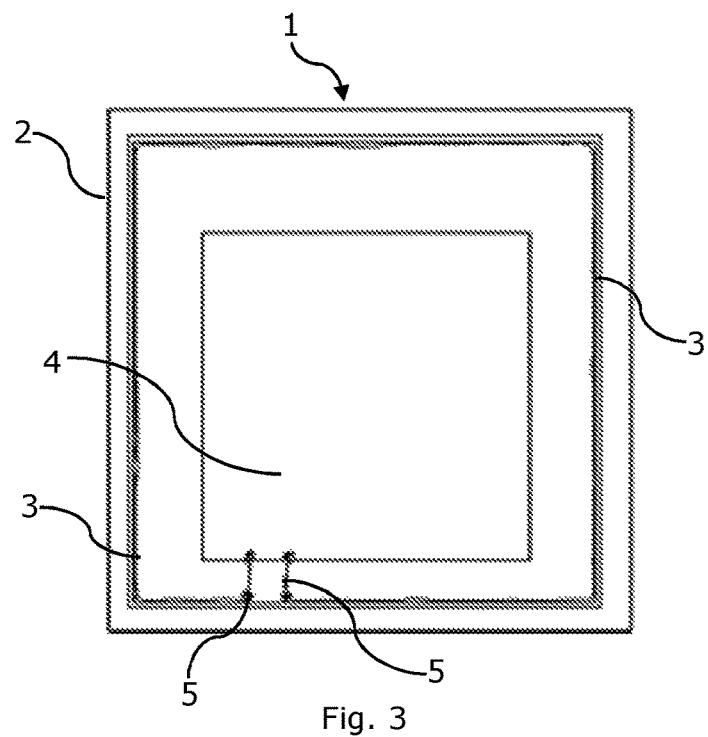
FIG. 3 is a schematic illustration of a field device housing according to the invention with a monitoring device disposed on the inner side of the field device housing.
Figure 4:
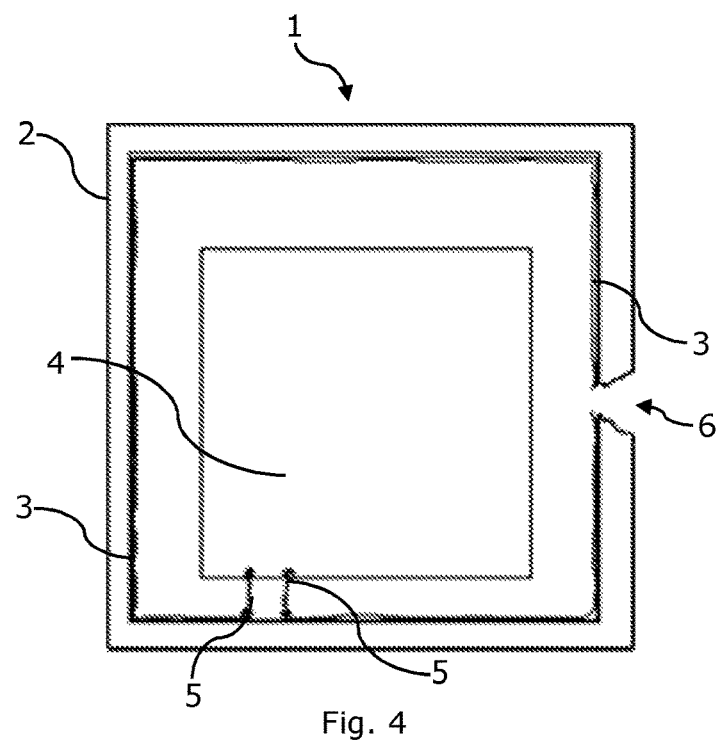
FIG. 4 is a schematic illustration of the field device housing according to FIG. 3, wherein the field device housing has a defect.

FIGS. 3 and 4 show a second design example, which corresponds in almost all features to the first design example. The conductor path 3 in the second design example is just not integrated in the housing wall 2, but is instead disposed on an inner side of the field device housing 1 on the housing wall 2. FIG. 4 shows a defect in the housing wall 2 with a conductor path break 6.

Figure 5:
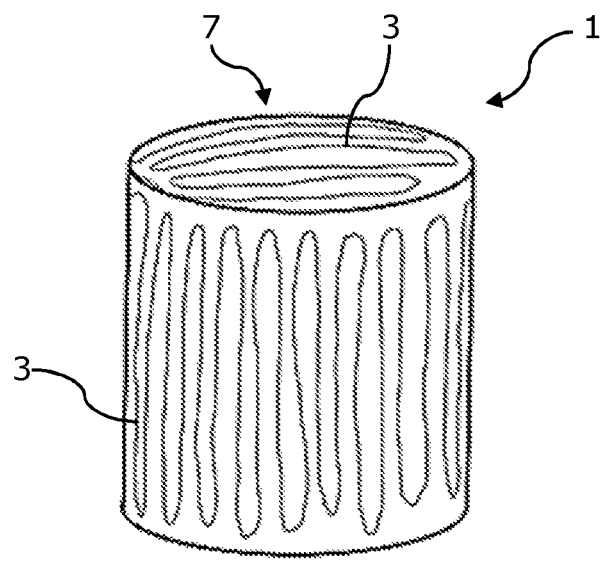
FIG. 5 is a line drawing evidencing a perspective view of a cylindrical field device housing according to the invention with a monitoring device.

FIG. 5 shows a third design example, which corresponds in almost all features to the first design example. The field device housing 1 is cylindrical and comprises conductor paths 3 both in the housing wall 2 and in the housing cover 7.

Figure 6:
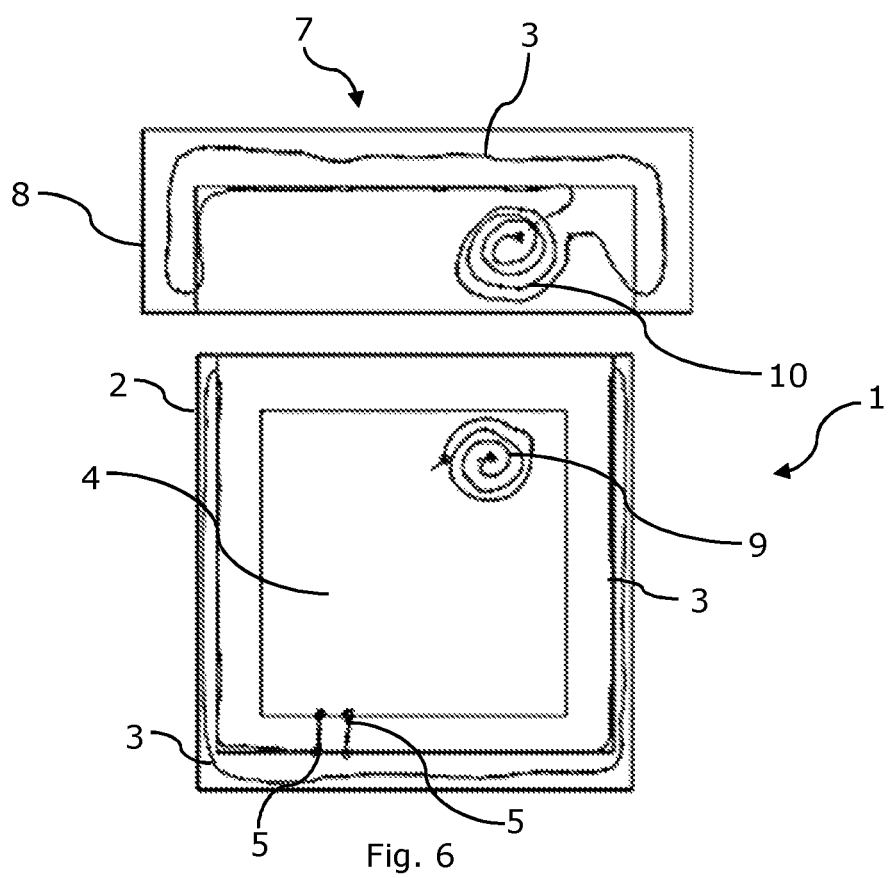
FIG. 6 is a schematic illustration of a field device housing according to the invention with a housing cover and a monitoring device disposed in the field device housing and the housing cover.

A fourth design example is shown in FIG. 6. The field device housing 1 is cylindrical, whereby it can also be polygonal. The field device housing 1 is furthermore made of an injection-moldable plastic and is produced using the IMSE manufacturing process.

The field device housing 1 comprises a housing wall 2, whereby the field device housing 1 is open on one side. A conductor path 3 is integrated in the housing wall 2, whereby the conductor path 3 is also partially not integrated in the housing wall 2 but rather extends on the inner side of the field device housing 1 on the housing wall 2.

The electronics 4 disposed in the field device housing 2 are connected to the conductor path 3 by means of connecting elements 5. The electronics 4 also comprise a transmitter element 9. A housing cover 7, which is designed to be releasable, is disposed facing the open side. The housing cover 7 comprises a wall 8, which partially covers the housing wall 2 when the field device housing 1 is closed. A conductor path 3 is also integrated in the housing cover 7, whereby the conductor path 3 also partially extends on an inner side of the housing cover 7. The conductor paths 3 can also be completely integrated or entirely disposed on the inner side of the field device housing 1 or the housing cover 7. The housing cover 7 further comprises a receiver element 10, which is disposed on the inner side of the housing cover 7 and is connected to the conductor path 3.

The transmitter element 9 can send a signal to the receiver element 10, whereby the receiver element 10 returns the signal to the transmitter element 9. If the transmitter element 9 receives a signal returned by the receiver element 10 that is not equal to the transmitted signal or does not receive a return signal, the electronics 4 detects the change of state of the monitoring unit 3 and thus the field device housing 1.

The field device housing 1 and the housing cover 7 can be firmly connected to one another with a frictional connection, with a threaded connection, or by means of additional clamping elements, so that a voltage-related flashover from the electronics 4, for example in an explosion-prone area, can be excluded.

LIST OF REFERENCE NUMBERS

1 Field device housing
2 Housing wall
3 Monitoring device, conductor path
4 Electronics
5 Connecting element
6 Conductor path break
7 Housing cover
8 Wall of the housing cover
9 Transmitter element
10 Receiver element Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A field device housing with electronics disposed in the field device housing, a housing cover and a monitoring device, wherein the electronics electrically check the monitoring device, and that the monitoring device indicates a state of the field device housing, wherein the housing cover comprises a receiver element, the electronics comprise a transmitter element and the electronics monitor the conductor path in the housing cover via a signal sent back from the transmitter element to the receiver element.

2. A field device housing of claim 1, wherein the monitoring device is integrated in a wall of the field device housing.

3. A field device housing of claim 1, wherein the monitoring device is disposed on an inner side of the field device housing.

4. The field device housing of claim 1, wherein a power supply of the field device is interrupted, or the electronics switch off, when the state changes.

5. The field device housing of claim 1, wherein the electronics are configured to send a signal to a superordinate unit, embodied as a control center, when the state changes.

6. The field device housing of claim 1, wherein the monitoring device forms a conductor path, and that the change in the state is a change in capacitance or an increase in resistance, embodied as a conductor path break.

7. The field device housing of claim 1, wherein the field device housing is made of injection-moldable plastic.

8. A method for producing the field device housing of claim 1 with a conductor path, comprising the following steps:
 a. printing and applying conductor paths to a plastic base, and
 b. inserting the plastic base into a plastic matrix by means of an injection molding process,
 wherein the plastic matrix forms the field device housing.

9. A method for determining a state of a field device housing with a housing cover and a monitoring device, comprising electronics disposed in the field device housing which are configured to monitor the state of the monitoring device, wherein the housing cover comprises a receiver element, the electronics comprise a transmitter element and the electronics monitor the conductor path in the housing cover via a signal sent back from the transmitter element to the receiver element, comprising thee following steps:
 a. monitoring the state of the field device housing, and
 b. reacting to a change in the state.

* * * * *